United States Patent
Shibamura et al.

(10) Patent No.: US 9,537,140 B2
(45) Date of Patent: Jan. 3, 2017

(54) MANGANESE SPINEL-TYPE LITHIUM TRANSITION METAL OXIDE

(71) Applicant: Mitsui Mining & Smelting Co., Ltd., Tokyo (JP)

(72) Inventors: Natsumi Shibamura, Ageo (JP); Yanko Marinov Todorov, Ageo (JP); Shinya Kagei, Ageo (JP); Yoshimi Hata, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 14/397,324

(22) PCT Filed: Apr. 25, 2013

(86) PCT No.: PCT/JP2013/062235
§ 371 (c)(1),
(2) Date: Oct. 27, 2014

(87) PCT Pub. No.: WO2013/161949
PCT Pub. Date: Oct. 31, 2013

(65) Prior Publication Data
US 2015/0147652 A1 May 28, 2015

(30) Foreign Application Priority Data
Apr. 27, 2012 (JP) ................................ 2012-103384

(51) Int. Cl.
*H01M 4/131* (2010.01)
*H01M 4/505* (2010.01)
(Continued)

(52) U.S. Cl.
CPC .............. *H01M 4/131* (2013.01); *C01G 53/54* (2013.01); *H01M 4/485* (2013.01); *H01M 4/505* (2013.01);
(Continued)

(58) Field of Classification Search
None
See application file for complete search history.

(56) References Cited

U.S. PATENT DOCUMENTS

| 6,337,158 B1 * | 1/2002 | Nakajima | .......... C01G 45/1242 |
| | | | 429/220 |
| 2007/0134558 A1 * | 6/2007 | Fukunaga et al. | ............ 429/329 |

FOREIGN PATENT DOCUMENTS

| CN | 102683668 A | 9/2012 |
| JP | 1173962 A | 3/1999 |

(Continued)

OTHER PUBLICATIONS

Takahashi et al. (A raw machine translation) (Abstract and Detailed Description) (Feb. 25, 2005).*

*Primary Examiner* — Miriam Stagg
*Assistant Examiner* — Carmen Lyles-Irving
(74) *Attorney, Agent, or Firm* — The Webb Law Firm

(57) ABSTRACT

Provided is a new 5 V class spinel exhibiting an operating potential of 4.5 V or more (5 V class), which can suppress the amount of gas generation during high temperature cycles. Suggested is a manganese spinel-type lithium transition metal oxide represented by formula: $Li[Ni_y Mn_{2-(a+b)-y-z} Li_a Ti_b M_z]O_4$ (wherein $0 \leq z \leq 0.3$, $0.3 \leq y < 0.6$, and M=at least one or more metal elements selected from the group consisting of Al, Mg, Fe and Co), in which in the above formula, the following relationships are satisfied: $a>0$, $b>0$, and $3 \leq b/a \leq 8$.

11 Claims, 2 Drawing Sheets

(51) Int. Cl.
*H01M 4/525* (2010.01)
*H01M 4/485* (2010.01)
*H01M 10/052* (2010.01)
*C01G 53/00* (2006.01)

(52) U.S. Cl.
CPC ........... *H01M 4/525* (2013.01); *H01M 10/052* (2013.01); *C01P 2002/32* (2013.01); *C01P 2002/52* (2013.01); *C01P 2002/77* (2013.01); *C01P 2006/12* (2013.01); *Y02E 60/122* (2013.01)

(56) References Cited

FOREIGN PATENT DOCUMENTS

| | | |
|---|---|---|
| JP | 2000235857 A | 8/2000 |
| JP | 2003197194 A | 7/2003 |
| JP | 2006236830 A | 9/2006 |
| JP | 2009176583 A | 8/2009 |
| WO | 2012014793 A1 | 2/2012 |
| WO | 2012165020 A1 | 12/2012 |

\* cited by examiner

MANGANESE SPINEL-TYPE LITHIUM TRANSITION METAL OXIDE

CROSS-REFERENCE TO RELATED APPLICATIONS

This application is the United States national phase of International Application No. PCT/JP2013/062235 filed Apr. 25, 2013, and claims priority to Japanese Patent Application No. 2012-103384 filed Apr. 27, 2012, the disclosures of which are hereby incorporated in their entirety by reference.

TECHNICAL FIELD

The present invention relates to a manganese spinel-type lithium transition metal oxide that can be used as a positive electrode active material for lithium secondary batteries, and more particularly, to a manganese spinel-type lithium transition metal oxide having an operating potential of 4.5 V or more (5 V class).

BACKGROUND ART

Lithium secondary batteries have features such as high energy density and long service life. Therefore, lithium secondary batteries are widely used as power supplies for electric appliances such as video cameras; portable electronic devices such as laptop computers and mobile telephones, and electric tools such as power tools. Recently, lithium secondary batteries are also applied to large-sized batteries that are mounted in electric vehicles (EV), hybrid electric vehicles (HEV) and the like.

A lithium secondary battery is a secondary battery having a structure in which, at the time of charging, lithium begins to dissolve as ions from a positive electrode and moves to a negative electrode to be stored therein, and at the time of discharging, lithium ions return from the negative electrode to the positive electrode, and it is known that the higher energy density of the lithium secondary battery is attributable to the electric potential of the positive electrode material.

Known examples of this kind of positive electrode active material for lithium secondary batteries include lithium transition metal oxides having a layered structure, such as $LiCoO_2$, $LiNiO_2$, and $LiMnO_2$; and lithium transition metal oxides having a manganese-based spinel structure (Fd-3m), such as $LiMn_2O_4$ and $LiNi_{0.5}Mn_{1.5}O_4$ (in the present invention, referred to as "manganese spinel-type lithium transition metal oxides").

Manganese spinel-type lithium transition metal oxides are inexpensive in terms of raw material cost, are non-toxic and highly safe, and have a nature resistant to overcharge. Therefore, attention has been paid to the lithium transition metal oxides as the next-generation positive electrode active materials for large-sized batteries for electric vehicles (EV), hybrid electric vehicles (HEV) and the like. Furthermore, spinel type lithium transition metal oxides (LMO) capable of three-dimensional insertion and extraction of Li ions have superior power output characteristics compared with lithium transition metal oxides having a layered structure, such as $LiCoO_2$. Therefore, it is expected to use the spinel type lithium transition metal oxides in applications where excellent power output characteristics are required, as in batteries for EV, batteries for HEV, and the like.

Among them, it is know that when a portion of Mn sites in $LiMn_2O_4$ is substituted with other transition metals (Cr, Co, Ni, Fe or Cu), the lithium transition metal oxide acquires an operating potential at near 5 V. Thus, currently, development of a manganese spinel-type lithium transition metal oxide having an operating potential of 4.5 V or more (5 V class) is in active progress.

For example, Patent Document 1 discloses, as a positive electrode active material for lithium secondary batteries exhibiting an electromotive force of 4.5 V or more (5 V class), a high capacity spinel type lithium manganese composite oxide positive electrode active material obtained by adding chromium as an essential additive component to a spinel type lithium manganese composite oxide, and further adding nickel or cobalt thereto.

Patent Document 2 discloses a crystal having a spinel structure, $LiMn_{2-y-z}Ni_yM_zO_4$ (provided that M: at least one selected from the group consisting of Fe, Co, Ti, V, Mg, Zn, Ga, Nb, Mo and Cu; $0.25 \leq y \leq 0.6$, and $0 \leq z \leq 0.1$), with which charging and discharging is conducted against Li metal at a potential of 4.5 V or more.

Patent Document 3 discloses a spinel type lithium manganese composite oxide represented by $Li_a(M_xMn_{2-x-y}A_y)O_4$ (wherein $0.4<x$, $0<y$, $x+y<2$, $0<a<1.2$; M includes one or more metal elements selected from the group consisting of Ni, Co, Fe, Cr and Cu, and include at least Ni; and A includes at least one metal element selected from Si and Ti, provided that when A includes only Ti, the value of the proportion of A, y, is such that $0.1<y$), as a positive electrode material for higher energy density lithium ion secondary batteries having a high voltage of 4.5 V or more against Li.

CITATION LIST

Patent Document

Patent Document 1: JP 11-73962 A
Patent Document 2: JP 2000-235857 A
Patent Document 3: JP 2003-197194 A The manganese spinel-type lithium transition metal oxides that have been hitherto proposed and can realize high energy density lithium ion secondary batteries, particularly, manganese spinel-type lithium transition metal oxides having an operating potential of 4.5 V or more (5 V class) (also referred to as "5 V class spinels"), have a critical problem in relation to practical use, that all of the 5 V class spinels generally have large amounts of gas generation during high temperature cycles.

Thus, an object of the present invention is to develop and provide a new manganese spinel-type lithium transition metal oxide (5 V class spinel) exhibiting an operating potential of 4.5 V or more (5 V class), which can suppress the amount of gas generation during high temperature cycles.

SUMMARY OF THE INVENTION

The present invention proposes a manganese spinel-type lithium transition metal oxide represented by formula: $Li[Ni_yMn_{2-(a+b)-y-z}Li_aTi_bM_z]O_4$ (wherein $0 \leq z \leq 0.3$, $0.3 \leq y < 0.6$; and M=at least one or more metal elements selected from the group consisting of Al, Mg, Fe and Co), characterized in that in the formula, $a>0$, $b>0$, $2-(a+b)-y-z<1.7$ and $3 \leq b/a \leq 8$.

The manganese spinel-type lithium transition metal oxide proposed by the present invention can exhibit an operating potential of 4.5 V or more (5 V class) by establishing the relationship between a and b in the above formula to be such that $3 \leq b/a \leq 8$, in other words, by adjusting the molar ratio of Ti with respect to Li in 16d sites to 2 to 8, and thus, it was successful in significantly suppressing the amount of gas generation during high temperature cycles.

MODE(S) FOR CARRYING OUT THE INVENTION

Figure 1:
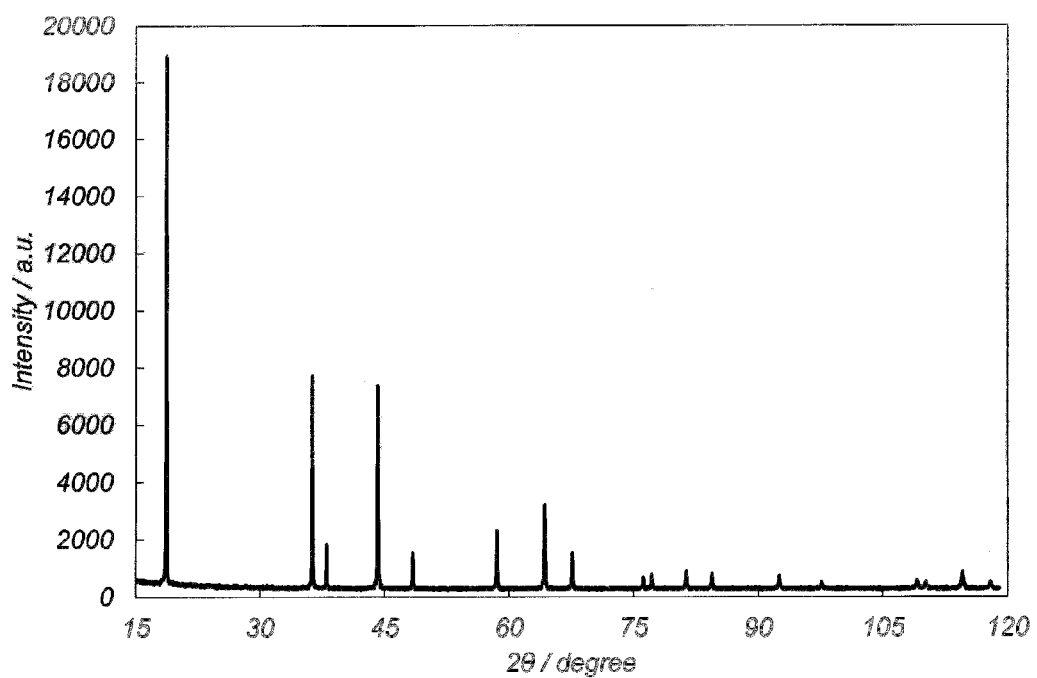
FIG. 1 is an XRD pattern of the manganese spinel-type lithium transition metal oxide obtained in Example 1.
Figure 2:
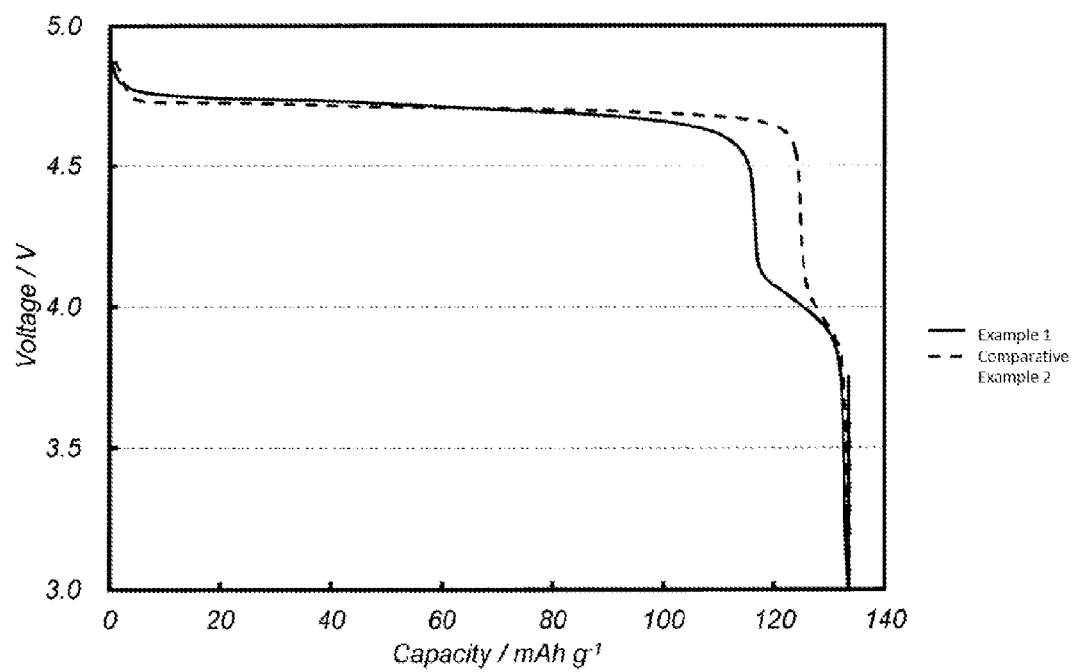
FIG. 2 is a charge-discharge curve obtained when the manganese spinel-type lithium transition metal oxides obtained in Example 1 and Comparative Example 2.

Next, the present invention will be described by way of exemplary embodiments. However, the present invention is not intended to be limited to the exemplary embodiments described below.

<Spinel of Invention>

The manganese spinel-type lithium transition metal oxide related to an exemplary embodiment of the present invention (referred to as "spinel of the invention") is a manganese spinel-type (space group: Fd-3m) lithium transition metal oxide represented by general formula: $Li[Ni_yMn_{2-(a+b)-y-z}Li_aTi_bM_z]O_4$.

The spinel of the invention having such a composition can exhibit an operating potential of 4.5 V or more (5 V class).

In the above general formula, "y" may be such that $0.30 \leq y < 0.60$, and is preferably such that $0.32 \leq y$ or $y \leq 0.5$, and among others, more preferably such that $0.33 \leq y$ or $y \leq 0.48$. If "y" is less than the above range, a decrease occurs in the 5 V capacity, and if "y" exceeds the above range, it is difficult to form a single layer.

"z" may be such that $0 \leq z \leq 0.30$, and is preferably such that $0.01 \leq z$ or $z \leq 0.25$, and among others, more preferably such that $0.02 \leq z$ or $z \leq 0.20$.

Furthermore, in the above general formula, "a" and "b" are such that $a>0$ and $b>0$, and it is desirable that they satisfy the relationship of $3 \leq b/a \leq 8$. Among others, it is preferable that $3 \leq b/a$ or $b/a \leq 6$.

When the relationship is in the range of $3 \leq b/a \leq 8$, the amount of gas generation that is an essential problem of this material can be reduced to a half, and the problem of gas generation can be solved.

In this case, the expression "b/a" in the above general formula means the molar ratio of Ti with respect to Li in 16d sites.

Furthermore, "M" in the formula may be at least one or more metal elements selected from the group consisting of M=Al, Mg, Fe and Co.

Fe and Co have an ability to manifest an operating potential of 5 V class as in the case of Ni, and Al and Mg have an effect of strengthening the bonding force to oxygen and enhancing structural stability.

(Lattice Constant)

From the viewpoint of the ease of insertion and release of Li ions at the time of charging and discharging, the lattice constant of the spinel of the invention is preferably 8.16 Å to 8.22 Å; more preferably 8.17 Å or more, or 8.21 Å or less; and among others, more preferably 8.18 Å or more, or 8.20 Å or less.

When the lattice constant of the spinel of the invention is in the range described above, a balance can be achieved at a high level between the power output characteristics and the charge-discharge cycle ability.

In regard to the manganese spinel-type lithium transition metal oxide having the composition described above, in order to adjust the lattice constant to the range of 8.16 Å to 8.22 Å, it is desirable to adjust, for example, the molar ratio of Ti with respect to Li in the 16d sites where Mn resides to 2 to 8.

(Oxygen Occupancy Rate)

For the spinel of the invention, the oxygen occupancy rate that can be determined by a Rietveld analysis is preferably 0.87 to 1.00; more preferably 0.90 or more, or 0.99 or less; and among others, even more preferably 0.92 or more, or 0.99 or less, from the viewpoint of the cycle characteristics.

In order to adjust the oxygen occupancy rate of the spinel of the invention to 0.87 to 1.00, the temperature of calcination or heat treatment may be adjusted.

(Specific Surface Area)

The specific surface area of the spinel of the invention is preferably 0.10 m$^2$/g to 1.00 m$^2$/g; and more preferably 0.60 m$^2$/g or less, and among others, 0.50 m$^2$/g or less, from the viewpoint of the reactivity with an electrolyte liquid.

In general, it is technical common knowledge that when the specific surface area increases, the amount of gas generation also increases. However, the spinel of the invention is characterized in that despite having a specific surface area to an extent equivalent to the specific surface areas of conventional manganese spinel-type lithium transition metal oxides, the amount of gas generation can be suppressed noticeably.

<Method for Producing Spinel of Invention>

The spinel of the invention can be obtained by mixing raw materials, for example, raw materials such as a lithium salt compound, a manganese salt compound, a nickel salt compound, a titanium salt compound and a metal (M) salt compound, pulverizing the mixture using a wet type pulverizer or the like, subsequently granulating and drying the pulverization product using a thermal spray dryer or the like, subjecting the pulverization product to calcination and a heat treatment, and classifying the resultant product as necessary.

At that time, it is preferable to design the raw material composition such that the molar ratio of Ti with respect to Li in the 16d sites where Mn resides, will be 3 to 8.

However, the production method for the spinel of the invention is not intended to be limited to such a production method. For example, a granulated powder that is supplied to calcination according to a so-called co-precipitation method may be produced.

Examples of the lithium salt compound include lithium hydroxide (LiOH), lithium carbonate ($Li_2CO_3$), lithium nitrate ($LiNO_3$), $LiOH \cdot H_2O$, lithium oxide ($Li_2O$), other fatty acid lithiums, and lithium halides. Among them, hydroxide, carbonate, and nitrate of lithium are preferred.

The manganese salt compound is not particularly limited. For example, manganese carbonate, manganese nitrate, manganese chloride, manganese dioxide, dimanganese trioxide, and trimanganese tetroxide can be used, and among them, manganese carbonate and manganese dioxide are preferred. Among them, electrolytic manganese dioxide that is obtainable by an electrolytic method is particularly preferred.

There are also no particular limitations on the kind of the nickel salt compound, and for example, nickel carbonate, nickel nitrate, nickel chloride, nickel oxyhydroxide, nickel hydroxide, and nickel oxide can be used. Among them, nickel carbonate, nickel hydroxide, and nickel oxide are preferred.

Regarding the titanium (Ti) and metal (M) salt compounds, carbonates, nitrates, chlorides, oxyhydroxides, hydroxides, oxides and the like of metals such as titanium (Ti), aluminum (Al), magnesium (Mg), cobalt (Co) and the like can be used.

Mixing of the raw materials is preferably carried out by performing wet mixing by adding a liquid medium such as water or a dispersant, and making a slurry, and it is preferable to pulverizing the slurry thus obtained with a wet pulverizer. However, it is also acceptable to perform dry pulverization.

Also, it is preferable to pulverize the slurry to obtain an average particle size (D50) of 0.2 µm to 1.0 µm.

Regarding the granulation method, the method may be a wet type method or a dry type method as long as various raw materials that have been pulverized in the previous step are dispersed within granulated particles without being separated, and an extrusion granulation method, a rolling granulation method, a fluidized bed granulation method, a mixing granulation method, a spray dry granulation method, a pressure molding granulation method, or a flake granulation method using a roll or the like may be used. However, when wet granulation is performed, it is necessary to sufficiently dry the granules before calcination. Regarding the drying method, drying may be carried out according to a known drying method such as a thermal spray drying method, a hot air drying method, a vacuum drying method, or a freeze drying method, and among others, a thermal spray drying method is preferred. The thermal spray drying method is preferably carried out using a thermal spray dryer (sprayer dryer).

Calcination is preferably carried out in a calcining furnace so as to maintain the granules in an air atmosphere and in an atmosphere with an adjusted oxygen partial pressure, or in a carbon dioxide atmosphere, or in some other atmosphere, at a temperature of 800° C. to 1000° C. (: means the temperature obtainable when a thermocouple is brought into contact with the calcination product in the calcining furnace) for 0.5 hours to 300 hours. At this time, it is preferable to select the calcination conditions in which transition metals are solid-solubilized at an atomic level and exhibit a single phase.

The kind of the calcining furnace is not particularly limited. For example, calcination can be conducted using a rotary kiln, a static furnace, or a calcining furnace other than those.

The heat treatment is preferably carried out by placing the calcination product in an air atmosphere in an environment at 600° C. to 850° C., and preferably 700° C. or higher, or 800° C. or lower, for 0.5 hours to 300 hours, such that oxygen can be easily incorporated into the spinel of the invention. At this time, if the heat treatment is carried out at a temperature lower than 600° C., the effect of heat treatment is not easily obtained, and there is a risk that oxygen may not be incorporated. On the other hand, if the heat treatment is carried out at a temperature higher than 850° C., sintering begins, and the powder characteristics intended by the present invention cannot be obtained.

<Use of Spinel of Invention>

The spinel of the invention can be effectively used as a positive electrode active material for lithium batteries, after being crushed and classified as necessary.

For example, a positive electrode mixture can be produced by mixing the spinel of the invention, a conductive material formed of carbon black or the like, and a binding agent formed from a TEFLON (registered trademark) binder or the like. Then, a lithium battery can be configured using such a positive electrode mixture for a positive electrode, using lithium or a material capable of storing and releasing lithium, such as carbon, for a negative electrode, and using solution obtained by dissolving a lithium salt such as lithium hexafluorophosphate ($LiPF_6$) in a mixed solvent such as ethylene carbonate-dimethyl carbonate as a nonaqueous electrolyte.

A lithium battery configured as such can be used in, for example, drive power supplies for installation in electronic devices such as laptop computers, mobile telephones, cordless telephone handsets, video movie cameras, liquid crystal TV's, electric shavers, portable radios, headphone stereo cassette players, backup power supplies, and memory cards; medical devices such as pacemakers and hearing aids; and electric vehicles. Among them, the lithium battery is particularly effective as a drive power supply for various mobile computers such as mobile telephones, PDA's (personal digital assistants), and laptop computers; electric vehicles (including hybrid electric vehicles); and power supplies for power storage, where excellent cycle characteristics are required.

<Explanation of Phrases>

The expression "X to Y" (where X and Y represent arbitrary numbers) as used in the present specification includes, unless particularly stated otherwise, the meaning of "X or more and Y or less" as well as the meaning of "preferably more than X" or "preferably less than Y".

Furthermore, the expression "X or more" (where X represents an arbitrary number) or "Y or less" (where Y represents an arbitrary number) includes the intention to the effect of "preferably more than X" or "preferably less than Y".

EXAMPLES

Next, the present invention will be described in more detail by way of Examples and Comparative Examples that were actually produced. However, the present invention is not intended to be limited to the Examples described below.

Example 1

Lithium carbonate, electrolytic manganese dioxide, nickel hydroxide, and anatase type titanium oxide were weighed such that the molar ratio would be Li:Mn:Ni:Ti=1.02:1.46:0.42:0.1. Water was added thereto, and the mixture was mixed and stirred. Thus, a slurry having a solid content concentration of 10 wt % was prepared.

A polycarboxylic acid ammonium salt (SN DISPERSANT 5468 manufactured by San Nopco, Ltd.) was added as a dispersant to the slurry thus obtained (raw material powder: 500 g) at a proportion of 5 wt % of the slurry solid content, and the mixture was pulverized with a wet type pulverizer for 29 minutes at 1300 rpm. Thus, the average particle size (D50) was adjusted to 0.5 µm or less.

The pulverized slurry thus obtained was granulated and dried using a thermal spray dryer (spray dryer, OC-16 manufactured by Ohkawara Kakohki Co., Ltd.). At this time, a rotating disc was used for spraying, and granulation and drying was carried out at a speed of rotation of 30,000 rpm and an amount of slurry supplied of 24 kg/hr, by adjusting the temperature so that the exit temperature of the drying column would be 100° C.

The granulated powder thus obtained was calcined using a static electric furnace, in air at 950° C. for 70 hours. The calcined powder obtained by calcination was classified with a sieve having a mesh size of 75 µm, and thus a manganese spinel-type lithium transition metal oxide powder (sample) was obtained.

Examples 2 to 5 and Comparative Examples 1 to 3

Manganese spinel-type lithium transition metal oxide powders (samples) were obtained in the same manner as in Example 1, except that the compositions of raw materials were changed based on the values of b/a in Table 1.

Example 6

A manganese spinel-type lithium transition metal oxide powder (sample) was obtained in the same manner as in Example 1, except that the composition of raw materials was changed based on the value of b/a in Table 1, and also, lithium tetraborate ($Li_2B_4O_7$) was added at a proportion of 0.014 mass %.

<Methods for Measuring Property Values>

Property values of the manganese spinel-type lithium transition metal oxide powders (samples) obtained in Examples and Comparative Examples were measured as follows.

(Chemical Analysis)

The manganese spinel-type lithium transition metal oxide powders (samples) obtained in Examples and Comparative Examples were subjected to an ICP analysis, and the compositions were investigated.

SPS-3520V manufactured by SII Nanotechnology, Inc. was used as the analysis apparatus, and a measurement wavelength of Li analytical line of 610.362 nm was used.

From the analysis results, it was confirmed that the amounts added were equal to the analyzed values.

(Specific Surface Area)

The specific surface areas of the manganese spinel-type lithium transition metal oxide powders (samples) obtained in Examples and Comparative Examples were measured as follows.

First, 0.5 g of a sample (powder) was weighed in a glass cell for a fluidized bed type gas adsorption method specific surface area analyzer, MONOSORB LOOP ("product name: MS-18" manufactured by Yuasa Ionics Co., Ltd.). The glass cell was purged with nitrogen gas for 5 minutes at a gas flow rate of 30 mL/min in a pretreatment apparatus for MONOSORB LOOP, and then the sample was heat treated in the nitrogen gas atmosphere at 250° C. for 10 minutes. Thereafter, the sample (powder) was analyzed by a single-point BET method using the MONOSORB LOOP.

For the adsorbent gas at the time of analysis, a mixed gas of 30% of nitrogen and 70% of helium was used.

(XRD Analysis)

An XRD analysis was carried out under the conditions described below using "D8 ADVANCE manufactured by Bruker AXS GmbH" to obtain an XRD pattern, and a Rietveld analysis was carried out based on this pattern using TOPAS Version 3. Thus, the lattice constant and the oxygen occupancy rate were determined.

Furthermore, validity of the Ti/Li ratio in the 16d sites was determined. At this time, the indicator of the validity was defined as follows: Rwp<10 and GOF<2.0.

=XRD Analysis Conditions=

Radiation source: CuKα, operation axis: 2θ/θ, measurement method: continuous, counting unit: cps Start angle: 10°, end angle: 120°

Detector: PSD

Detector Type: VANTEC-1

High voltage: 5585 V

Discr. Lower Level: 0.35 V

Discr. Window Width: 0.25 V

Grid Lower Level: 0.075 V

Grid Window Width: 0.524 V

Flood Field Correction: Disabled

Primary radius: 250 mm

Secondary radius: 250 mm

Receiving slit width: 0.1436626 mm

Divergence angle: 0.3°

Filament Length: 12 mm

Sample Length: 25 mm

Receiving Slit Length: 12 mm

Primary Sollers: 2.623°

Secondary Sollers: 2.623°

Lorentzian, 1/Cos: $0.004933548^{Th}$

<Battery Evaluation>

Laminate type batteries were produced using the manganese spinel-type lithium transition metal oxide powders (samples) produced in Examples and Comparative Examples as positive electrode active materials. A gas generation evaluation test and a battery performance evaluation test as described below were carried out using the batteries.

(Production of Laminate Type Battery)

89 wt % of each of the manganese spinel-type lithium transition metal oxide powders (samples) produced in Examples and Comparative Examples, 5 wt % of acetylene black as a conductive aid, and 6 wt % of PVDF as a binding material were mixed, and NMP (N-methylpyrrolidone) was added thereto to prepare the mixture into a paste form. This paste was applied on an Al foil current collector having a thickness of 15 μm, and the paste was dried at 120° C. Thereafter, the coated current collector was pressed to a thickness of 80 μm, and thus a positive electrode sheet was produced.

A copper foil having a thickness of 18 μm was used as a negative electrode current collector. As an active material therefor, 92 wt % of graphite and 8 wt % of PVDF as a binding material were mixed, and NMP was added thereto to prepare the mixture into a paste form. This paste was uniformly applied on the negative electrode current collector, and the paste was dried at 100° C. Thereafter, the coated current collector was pressed to a thickness of 80 μm, and thus a negative electrode sheet was produced.

The positive electrode sheet obtained as described above was cut to a size of 2.9 cm×4.0 cm, and this was used as a positive electrode. Also, the negative electrode sheet obtained as described above was cut to a size of 3.1 cm×4.2 cm, and this was used as a negative electrode. A separator (made from a porous polyethylene film) that had been impregnated with an electrolyte liquid obtained by dissolving $LiPF_6$ in a mixed solvent of ethylene carbonate, ethyl methyl carbonate and dimethyl carbonate (volume ratio=20:20:60) at a concentration of 1 mol/L, and adding 2 vol % of vinylene carbonate as an additive to the solution, was placed between the positive electrode and the negative electrode. Thus, a laminate type battery was produced.

(Gas Generation Evaluation Test)

A laminate type battery produced by the method described above was left to stand for 12 hours, and then the battery was subjected to charging at a current density of 0.2 mA/cm² in a measurement environment at 25° C. until the potential difference between the two electrodes reached 4.9 V, and then to discharging at a current density of 0.2 mA/cm² until the potential difference reached 3.0 V. Thereafter, the measurement environment temperature was changed to 45° C., and the battery was left to stand for 4 hours. Then, the battery was subjected to charging at the same current density as described above, until the potential difference between the two electrodes reached 4.9 V, the voltage was maintained for 168 hours, and then the battery was subjected to discharging at the same current density until the potential difference reached 3.0 V.

The amount of gas generation (mL) generated up to this stage was measured by a volumetric immersion method (solvent replacement method based on Archimedes' principle).

The results of Table 1 are average values determined from the respective measurement values of two laminate type batteries in each case.

(Battery Performance Evaluation Test)

A laminate type battery produced by the method described above was subjected to charging and discharging, and thus battery performance was evaluated as follows.

The charge-discharge voltage range was set to 3.0 V to 5.0 V for the first cycle. A current value that would give a charge-discharge rate of 0.2 C was calculated from the content of the positive electrode active material in the positive electrode, and a current was passed.

Then, the ratio of the capacity at 2 C with respect to the capacity at 0.1 C (×100) was measured as a rate characteristic, and also, the capacity (mAh/g) of the third cycle at 0.1 C was measured as the initial capacity. The values are presented in Table 1.

TABLE 1

|  | 8a site | 16d site | | | | Specific surface area ($m^2/g$) | Lattice constant (Å) | | | Oxygen occupancy rate | Amount of gas generation (mL) | Rate characteristic ((Capacity at 1C/capacity at 0.1C × 100:%) | 0.1C capacity @ $3^{rd}$ cycle (mAh/g) |
|---|---|---|---|---|---|---|---|---|---|---|---|---|---|
|  | b/a | Li | Li | Mn | Ni | Ti |  |  | GOF | Rwp |  |  |  |  |
| Example 1 | 5.00 | 1.000 | 0.020 | 1.460 | 0.420 | 0.100 | 0.23 | 8.188 | 1.80 | 2.72 | 0.98 | 14 | 90 | 133 |
| Example 2 | 3.03 | 1.000 | 0.033 | 1.456 | 0.410 | 0.100 | 0.27 | 8.188 | 1.82 | 2.78 | 0.96 | 18 | 90 | 134 |
| Example 3 | 5.00 | 1.000 | 0.040 | 1.360 | 0.400 | 0.200 | 0.20 | 8.199 | 1.82 | 2.82 | 0.97 | 18 | 92 | 131 |
| Example 4 | 4.00 | 1.000 | 0.025 | 1.460 | 0.415 | 0.100 | 0.24 | 8.197 | 1.84 | 2.77 | 0.97 | 18 | 92 | 135 |
| Example 5 | 5.82 | 1.000 | 0.017 | 1.450 | 0.430 | 0.100 | 0.22 | 8.188 | 1.82 | 2.73 | 0.97 | 20 | 90 | 137 |
| Example 6 | 5.00 | 1.000 | 0.040 | 1.320 | 0.440 | 0.200 | 0.17 | 8.198 | 1.83 | 2.85 | 0.94 | 20 | 86 | 122 |
| Comparative Example 1 | — | 1.000 | 0.000 | 1.450 | 0.450 | 0.100 | 0.22 | 8.185 | 1.96 | 2.79 | 0.98 | 24 | 89 | 132 |
| Comparative Example 2 | — | 1.000 | 0.000 | 1.550 | 0.450 | 0.000 | 0.25 | 8.170 | 1.79 | 2.64 | 0.97 | 36 | 35 | 136 |
| Comparative Example 3 | 10.00 | 1.000 | 0.020 | 1.340 | 0.440 | 0.200 | 0.20 | 8.199 | 1.88 | 2.75 | 0.97 | 56 | 93 | 132 |

DISCUSSION

The "b/a" in Table 1 is the ratio of "b" to "a" in the case in which the manganese spinel-type lithium transition metal oxides obtained in Examples 1 to 6 and Comparative Examples 1 to 3 are represented by general formula: $Li[Ni_y Mn_{2-(a+b)-y-z} Li_a Ti_b M_z]O_4$ (wherein M=at least one or more metal elements selected from the group consisting of Al, Mg, Fe and Co).

From the results of Table 1, it was found that when the relationship: $3 \leq b/a \leq 8$ is satisfied, gas generation can be significantly suppressed.

As described above, "b/a" is a molar ratio of Ti to Li in the 16d sites. It is contemplated that when the molar ratio of Ti to Li in the 16d sites was adjusted to 3 to 8 by conducting substitution to achieve a composition close to LTO ($Li_{4/3}Ti_{5/3}O_4$) in the spinel structure, the crystal structure of the matrix was stabilized, and a decrease in capacity and the amount of gas generation could be significantly suppressed.

It may be considered that the same effect would be obtained even in a case in which a metal such as Al, Mg, Fe or Co is further substituted, from the viewpoint that single substitution of Mn is enabled.

The invention claimed is:

1. A manganese spinel-type lithium transition metal oxide represented by formula: $Li[Ni_y Mn_{2-(a+b)-y-z} Li_a Ti_b M_z]O_4$, wherein $0 \leq z \leq 0.3$, $0.3 \leq y < 0.6$, and M=at least one or more metal elements selected from the group consisting of Al, Mg, Fe and Co, having a crystal structure of space group Fd-3m, wherein in the above formula, the $Ni_y$, $Mn_{2-(a+b)-y-z}$, $Li_a$, $Ti_b$ and $M_z$ exist in 16d sites in the crystal structure of the space group Fd-3m, a molar ratio of Li (a) existing in the 16d sites is a>0, a molar ratio of Ti (b) existing in the 16d sites is b>0, a total molar ratio of Li, Ti, Ni, and M (a+b+y+z) existing in the 16d sites is 0.3<(a+b+y+z), and the molar ratio of Ti with respect to Li (b/a) existing in the 16d sites is $3 \leq b/a \leq 8$, the manganese spinel-type lithium transition metal oxide exhibiting an operating potential of 4.5 V or more.

2. The manganese spinel-type lithium transition metal oxide according to claim 1, wherein a lattice constant is 8.16 Å to 8.22 Å.

3. The manganese spinel-type lithium transition metal oxide according to claim 1, wherein a specific surface area is 0.10 $m^2/g$ to 1.00 $m^2/g$.

4. The manganese spinel-type lithium transition metal oxide according to claim 1, wherein an oxygen occupancy rate that can be determined by a Rietveld analysis is 0.87 to 1.00.

5. A lithium secondary battery comprising the manganese spinel-type lithium transition metal oxide according to claim 1 as a positive electrode active material.

6. The manganese spinel-type lithium transition metal oxide according to claim 2, wherein a specific surface area is 0.10 $m^2/g$ to 1.00 $m^2/g$.

7. The manganese spinel-type lithium transition metal oxide according to claim 2, wherein an oxygen occupancy rate that can be determined by a Rietveld analysis is 0.87 to 1.00.

8. The manganese spinel-type lithium transition metal oxide according to claim 3, wherein an oxygen occupancy rate that can be determined by a Rietveld analysis is 0.87 to 1.00.

9. A lithium secondary battery comprising the manganese spinel-type lithium transition metal oxide according to claim 2 as a positive electrode active material.

10. A lithium secondary battery comprising the manganese spinel-type lithium transition metal oxide according to claim 3 as a positive electrode active material.

11. A lithium secondary battery comprising the manganese spinel-type lithium transition metal oxide according to claim 4 as a positive electrode active material.

* * * * *